EDMUND R. ROBUCK
CLIFFORD F. DEININGER
INVENTOR.

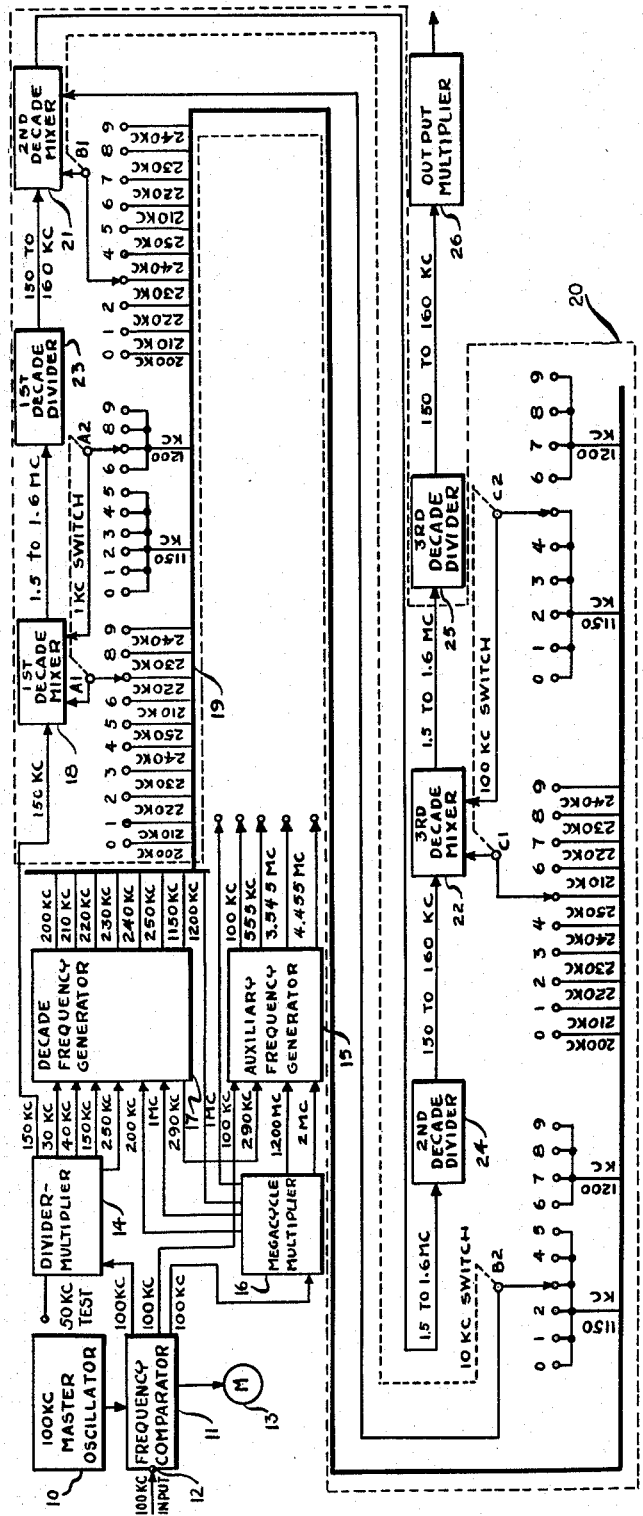

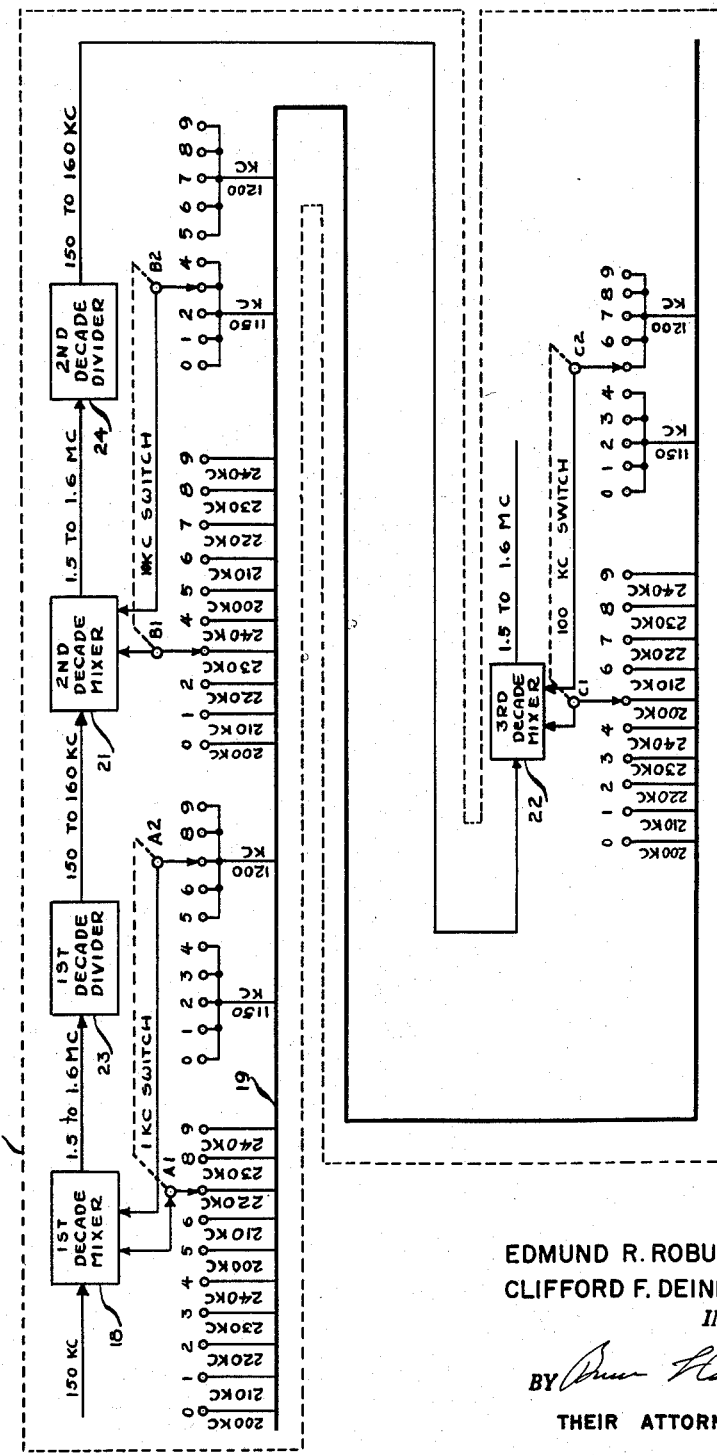

BY

THEIR ATTORNEY

Nov. 24, 1959  E. R. ROBUCK ET AL  2,914,733
FREQUENCY SYNTHESIZER SYSTEM OR THE LIKE
Filed June 10, 1957  9 Sheets-Sheet 4
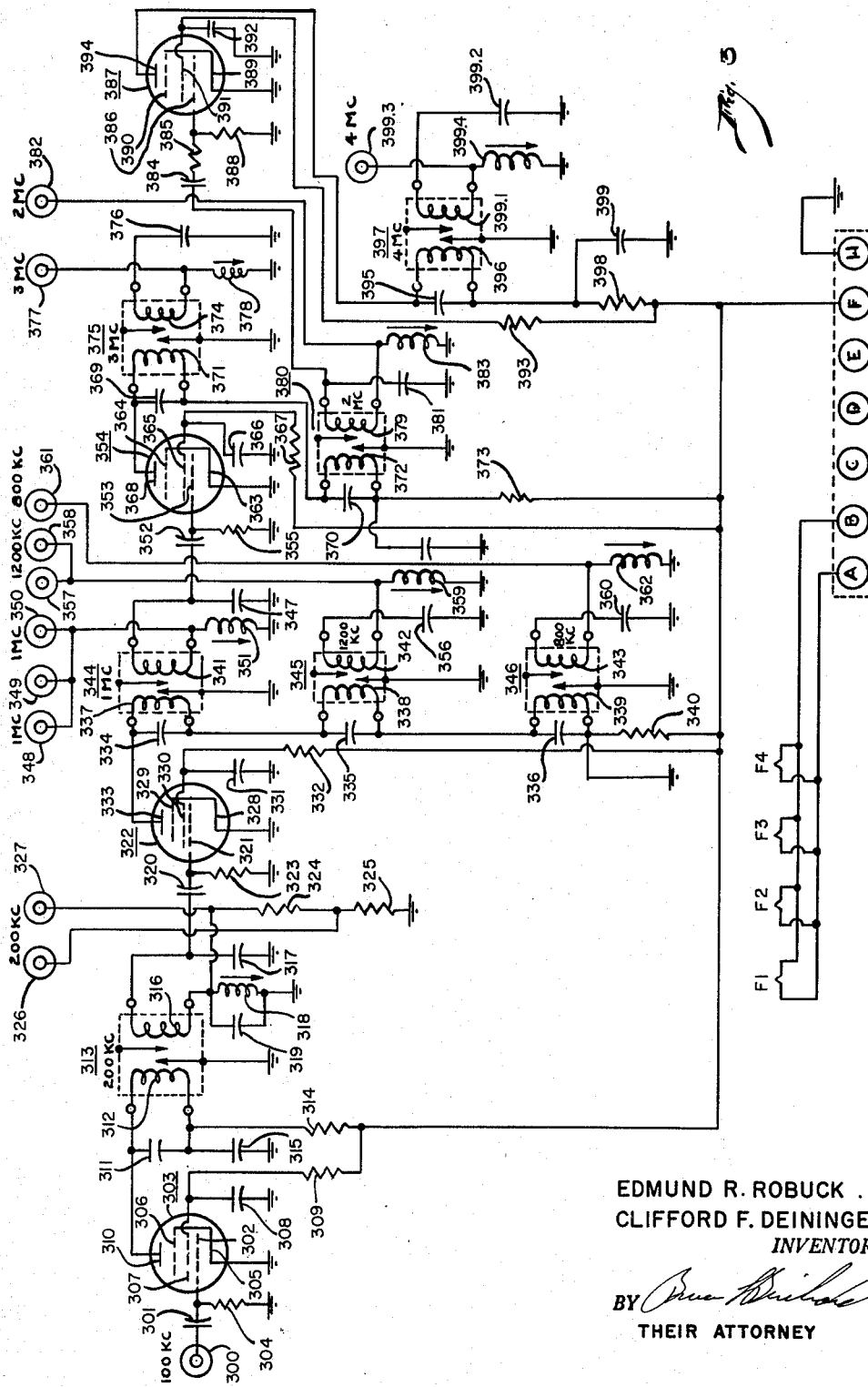
EDMUND R. ROBUCK
CLIFFORD F. DEININGER
*INVENTOR.*
BY
THEIR ATTORNEY

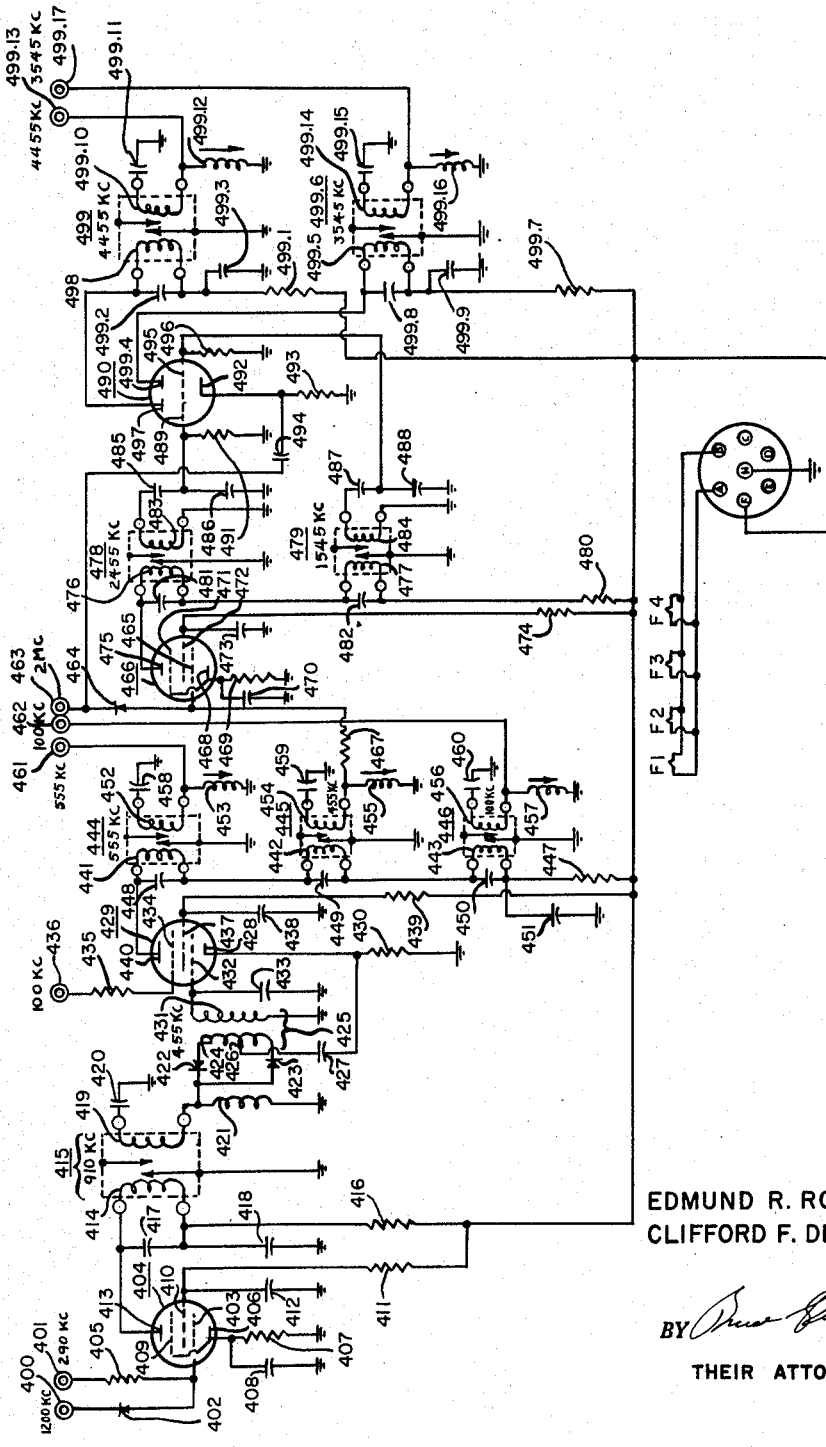
EDMUND R. ROBUCK
CLIFFORD F. DEININGER
INVENTOR.
THEIR ATTORNEY

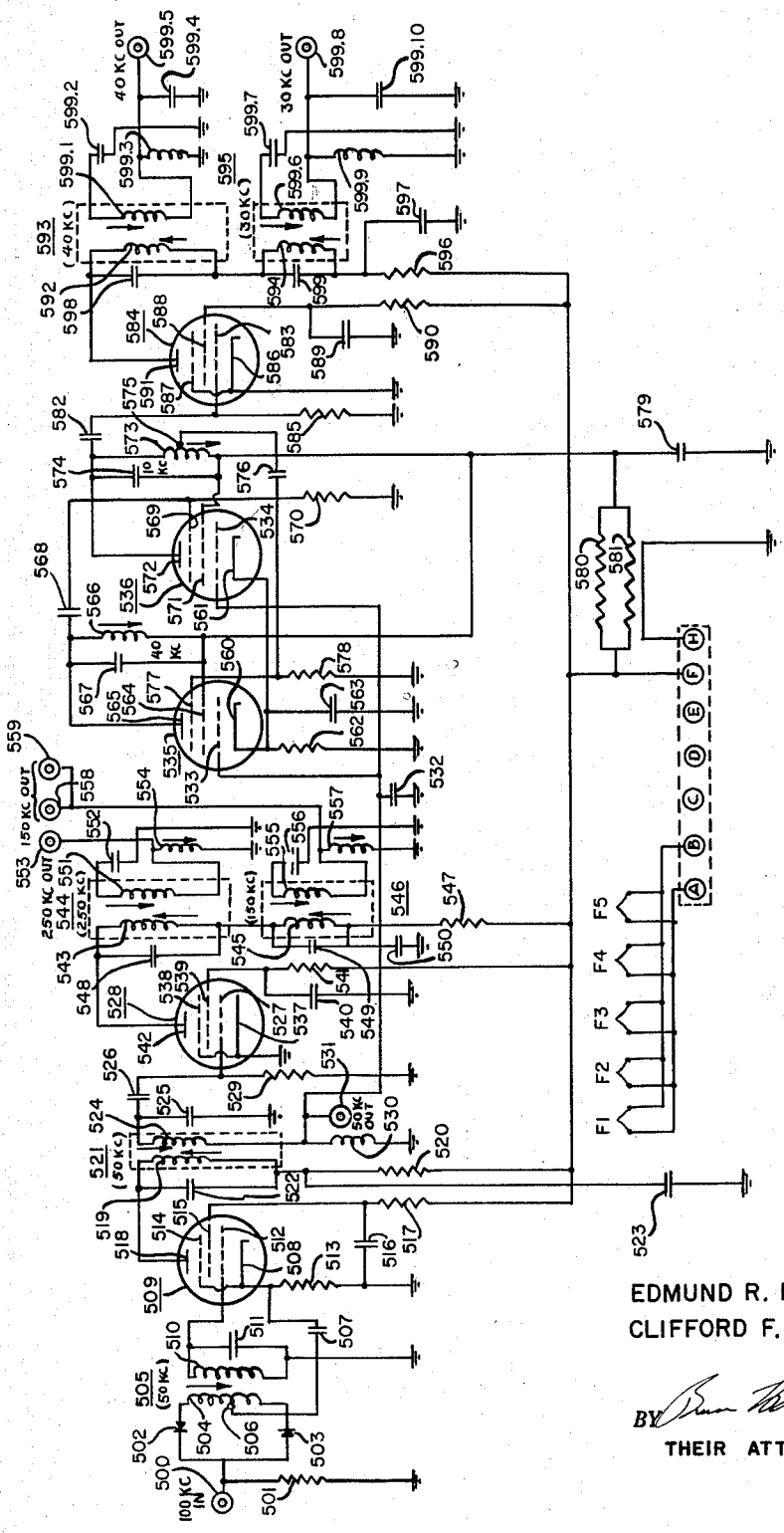

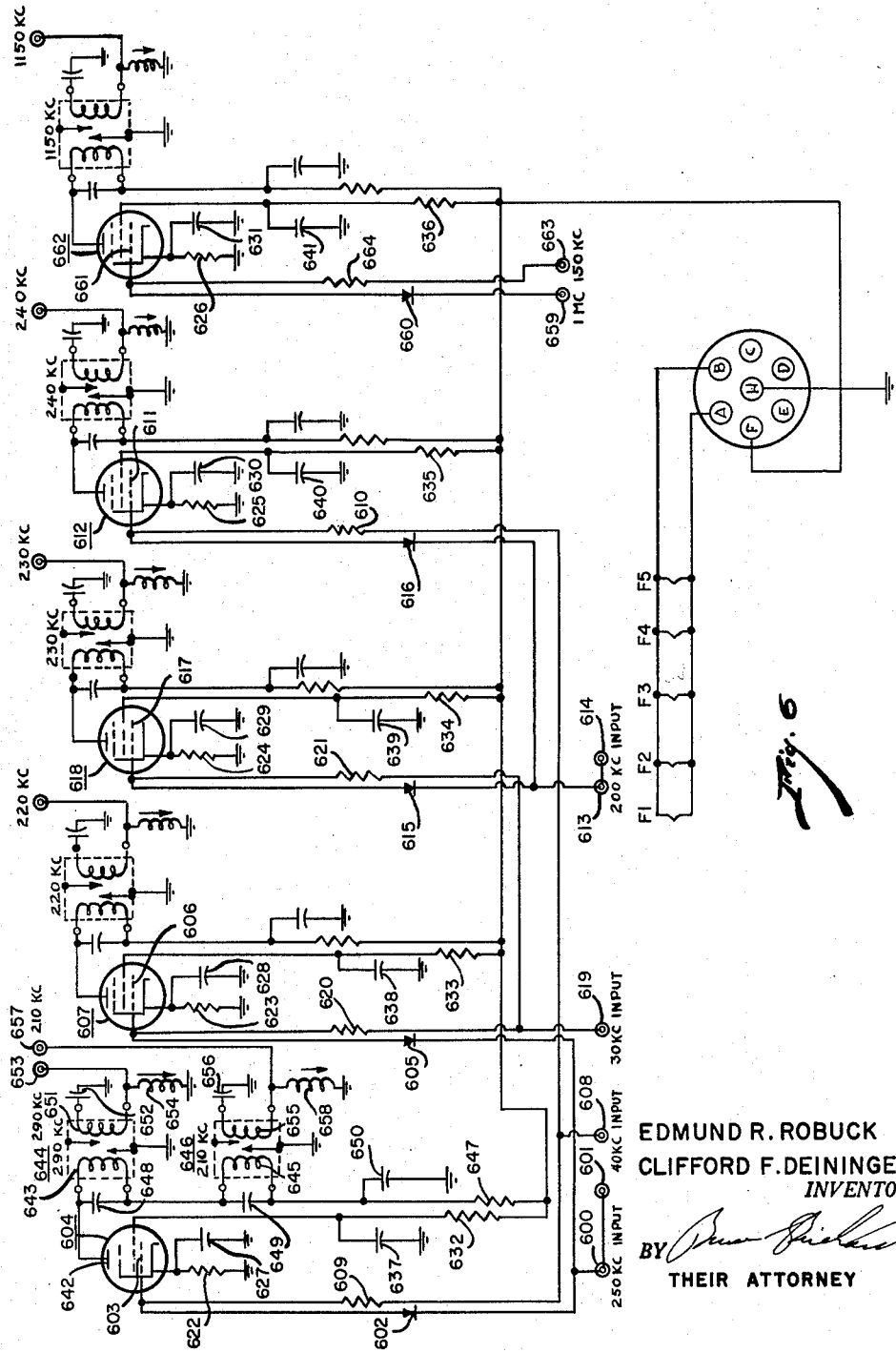

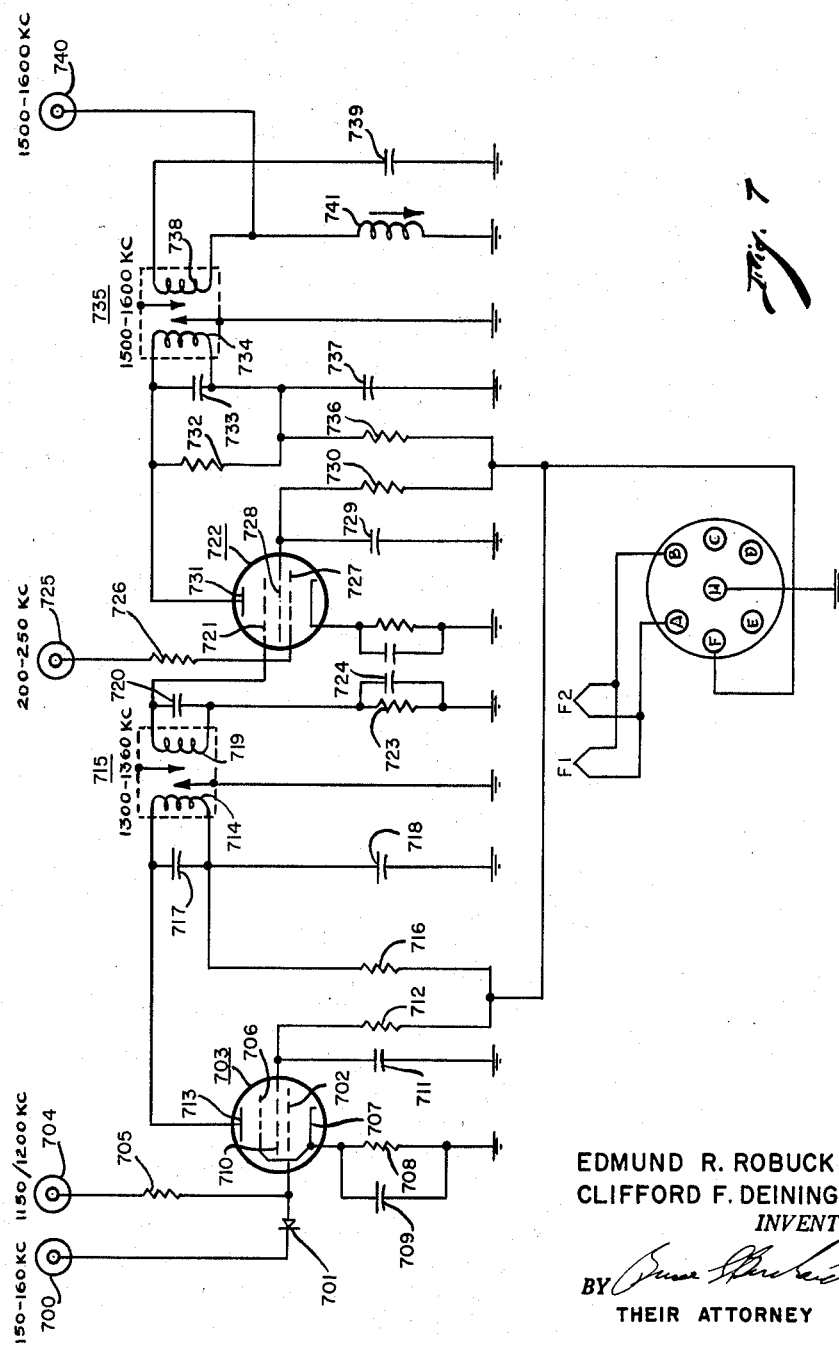

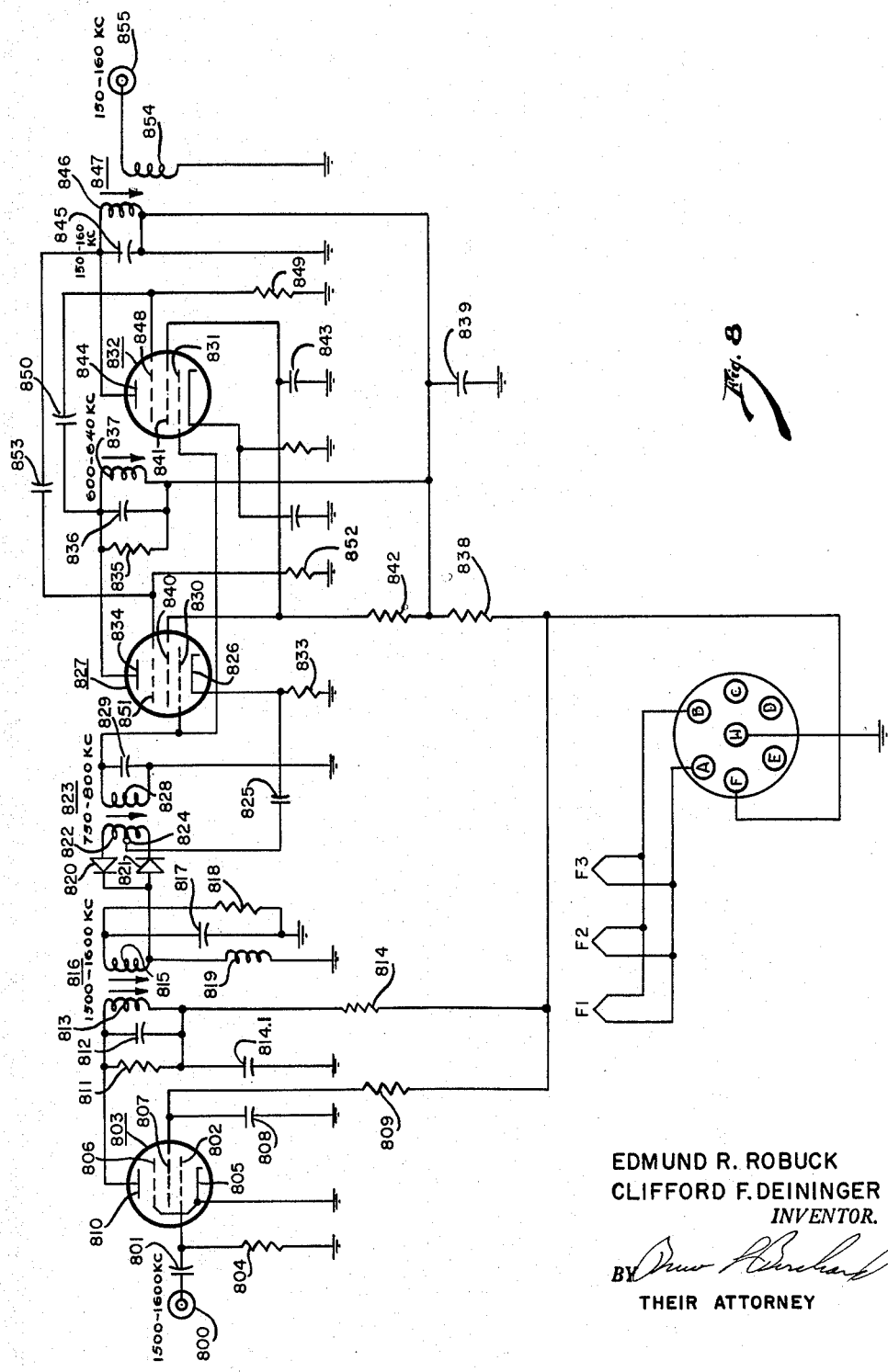

United States Patent Office 2,914,733
Patented Nov. 24, 1959

2,914,733

FREQUENCY SYNTHESIZER SYSTEM OR THE LIKE

Edmund R. Robuck, Los Angeles, and Clifford F. Deininger, Inglewood, Calif., assignors to Hoffman Electronics Corporation, a corporation of California Application June 10, 1957, Serial No. 664,522

14 Claims. (Cl. 331—39)

This invention is related to frequency synthesizer systems in general, and more particularly to a new and improved system capable of generating a complete series of stepped frequencies separated by a chosen frequency interval, which synthesizer system of the present invention will exhibit simplicity of design and yet optimum capabilities of performance.

In the past, many types of frequency synthesizer systems have been employed. Such frequency synthesizer systems as are currently in use include extensive circuitry, perhaps a great number of crystal-controlled oscillators, and a vast number of frequency multiplier and frequency divider circuits. It is of course true that the more extensive the circuitry of the frequency synthesizer system becomes, the more will uncontrollable variables be present in the system; accordingly, reliability of the over-all system will suffer. Additionally, the components generally employed in frequency synthesizer systems are quite cumbersome and oft times are unsatisfactory. Consider for example the general scale of 10 divider which may take the form either of a synchronized blocking oscillator, a synchronized multivibrator, or a three-three-one regenerative divider. The first two types of dividers are often unsatisfactory in that any tendency inherent in the circuitry for "slipping sync" will cause the divider to operate at its own natural frequency. The last divider mentioned, i.e. the three-three-one regenerative divider circuit, is generally employable at only one specific frequency; also, this type of divider requires a great number of tube stages.

Therefore, it is an object of the present invention to provide a new and useful frequency synthesizer system capable of generating a complete series of frequencies stepped in desired increments.

It is an additional object of the present invention to provide a new and useful frequency synthesizer system which will be compact, which will not require extensive circuitry, and yet which will exhibit a high degree of performance.

It is an additional object of the present invention to provide a novel frequency divider circuit for use in the above-mentioned frequency synthesizer system, which divider circuit will be of a simple and inexpensive design and yet highly satisfactory in performance characteristics.

It is an additional object of the present invention to provide a new and useful mixer circuit readily employable in the frequency synthesizer system of the present invention, which mixer, by its regenerative circuitry, will exhibit a high degree of frequency locking despite its wide band design.

It is a still further object of the present invention to provide a new and useful frequency synthesizer system in which, by the generation of key frequencies relative to the source frequency, almost any number of accurate frequencies and frequency increments may be generated.

According to the present invention, a plurality of signals having related frequencies are fed to each of a plurality of mixer, divider combinations to be mixed with the chosen input signal. The several mixer-divider combinations are serially connected, provided with selectable frequency switch means, and are adapted to produce by their unique combination any desired number of frequencies in almost any frequency range and stepped a chosen frequency increment apart. Each of the divider circuits employed include a novel balanced modulator type circuit with cathode return feedback. The divider circuits as well as the other associated circuits of the system may include what are termed criss-cross mixers of a regenerative type.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which, Figure 1 is a block diagram of a frequency synthesizer system according to the present invention.

Figure 1A is a schematic diagram in block form of an alternate form or configuration of a portion of the circuitry of Figure 1.

Figure 3 is a schematic diagram of a "megacycle multiplier," as it is termed, employed in the present invention.

Figure 4 is a schematic diagram of an auxiliary frequency generator used in the present invention.

Figure 5 is a schematic diagram of a divider-multiplier circuit employed by the present invention.

Figure 6 is a schematic diagram of a decade frequency generator used in the present invention.

Figure 7 is a schematic diagram of a decade mixer employed at at least three places in the frequency synthesizer system illustrated in Figure 1.

Figure 8 is a schematic diagram of a decade divider employed at at least three places in the over-all frequency synthesizer system illustrated in Figure 1.

Figure 2:
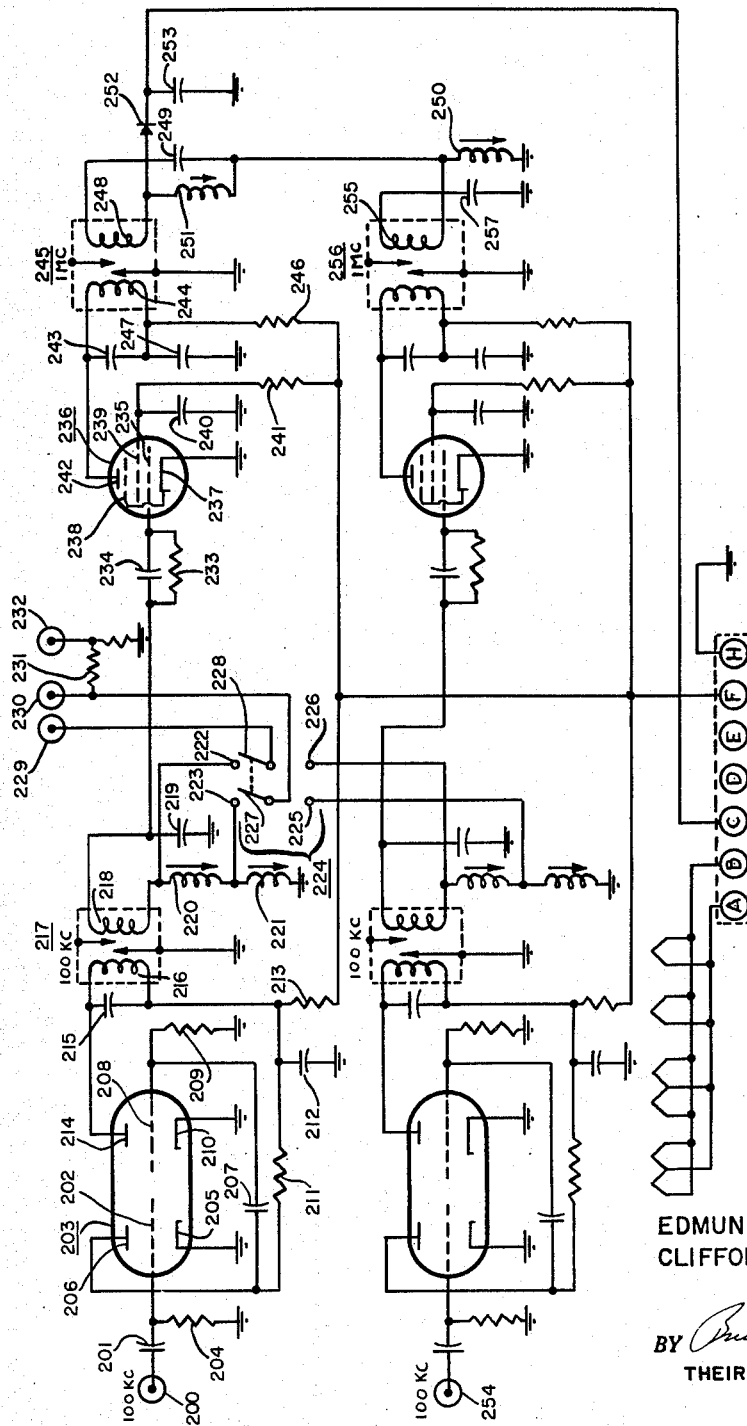
Figure 2 is a schematic diagram of a frequency comparator circuit employed by the present invention.

In Figure 1, master oscillator 10 is preferably of the crystal controlled type and is coupled as shown to frequency comparator 11. Likewise coupled to frequency comparator 11 is input terminal 12 which is adapted for coupling to an external source of input signals. Purely for purposes of discussion, master oscillator 10 is designated in Figure 1 as a 100 kc. oscillator. Accordingly, the output signal frequency from master oscillator 10 may be compared with the 100 kc. signal from an external standard, and any deviation between the two may be noted by reference to meter 13, which is also coupled to frequency comparator 11. Any deviation between the output signal frequency of master oscillator 10 and the signal frequency from the external standard coupled to frequency comparator 11 may be adjusted in the master oscillator circuit in order to constitute master oscillator 10 as a correct standard for the entire synthesizer system. If desired, of course the frequency correction may be made in the frequency comparator circuit 11 itself. Whether the frequency correction be made in the master oscillator circuit or in the frequency comparator circuit, the devices and techniques employed for correction are commonly known to those skilled in the art and will not be discussed. Frequency comparator 11 may be provided with three 100 kc. output circuits with the first output circuit being coupled to the divider-multiplier 14, the second 100 kc. output circuit to auxiliary frequency generator 15, and the third 100 kc. output circuit to the megacycle multiplier 16. It will of course be understood that all frequencies listed as examples in the figures and contained herein in the specification are purely by way of example only. Megacycle multiplier 16 may be designed to include the 200 kc. and 1 megacycle output circuits, which are coupled to decade frequency generator 17, and also the 1.200 mc. and 2 mc. output circuits which are coupled to auxiliary frequency generator 15. Divider-multiplier 14 will include the 30 kc., 40 kc., 150 kc., and 250 kc. output circuits shown in Figure 1 to be coupled to decade frequency generator 17. Divider-multiplier 14 will also include a 150 kc. output circuit which is coupled directly to first decade mixer 18. Decade frequency generator 17 will include a 290 kc. output circuit which is coupled to auxiliary frequency generator 15 and also the 200 kc., 210 kc., 220 kc., 230 kc., 240 kc., 250 kc., and 1150 kc. output circuits which are coupled to the switching circuits which follow. Auxiliary frequency generator 15, as is shown, includes four output circuits exhibiting characteristic frequencies of 100 kc., 555 kc., 3.545 mc., and 4.455 mc., respectively. These output signal frequencies may be employed in mixer circuits in a conventional manner. The purpose of the inclusion of auxiliary frequency generator 15 in the description of the present invention is to indicate that with the input signal frequencies given, the abovementioned output signal frequencies may be conveniently obtained. A complete circuit description of the several circuit components, including auxiliary frequency generator 15, will be given hereinafter.

Megacycle multiplier 16 supplies a 1.200 mc. output signal the circuit of which is included in wire lead harness 19 as shown. Also included within harness 19 will be the plurality of output wire leads leading from decade frequency generator 17 and exhibiting frequencies of 200 kc., 210 kc., 220 kc., 230 kc., 240 kc., 250 kc., and 1150 kc., respectively. The heart of the system is included within the dotted line block of circuit 20, which as shown includes the several switching circuits. It will be noted that the circuit 20 includes six switches, i.e. $A_1$, $A_2$, $B_1$, $B_2$, $C_1$, and $C_2$. Of course, pairs of switches may be ganged together so as to constitute the three switches, namely the A switch, the B switch, and the C switch. In such event, the several switches A, B, and C will be double-pole switches. The aforementioned 200 through 250 kc. wire leads are coupled as indicated to switch contact 0 through 9 as shown of the three switches $A_1$, $B_1$, and $C_1$. The aforementioned 1150 kc. wire lead may be coupled as shown to the 0 through 5 switch contacts of the several switches $A_2$, $B_2$, and $C_2$. The 1200 kc. wire lead is coupled to the numbers 6 through 9 switch contacts of the several switches $A_2$, $B_2$, and $C_2$. The switch arms of the several switches A, B, and C, are coupled to their respective decade mixers 18, 21, and 22. A schematic diagram of each of the several mixers shall be hereinafter given. It will be found that each of the several decade mixers is a two stage mixing device including two mixing processes; the first mixing process is that of mixing either 1150 kc. or 1200 kc. with the 150 kc. input signal from divider-multiplier 14; the second mixing process includes the mixing of the upper sideband of the first mixing process (i.e., the resultant 1300 kc. or 1350 kc.) with either 200 kc., 210 kc., 220 kc., 230 kc., 240 kc., or 250 kc. derived from decade frequency generator 17. Following through these two mixing processes, one will discover that there will be obtained from the output of first decade mixer 18 a series of stepped frequencies, i.e. 1500 kc., 1510 kc., 1520 kc. . . . 1590 kc., depending upon whether switch $A_1$ (ganged with switch $A_2$) is set at switch contact 0, 1, 2 . . . 9. Hence, what is derived then from first decade mixer 18 will be a group of frequencies from 1500 kc. through 1590 kc., stepped 10 kc. apart. If the result is passed through first decade divider 23, the result will be signal frequencies of 150 kc., 151 kc., 152 kc. . . . 159 kc., depending again upon the switch position of $A_1$—$A_2$. Thus, the output signal frequencies from first decade divider 23 begin at 150 kc. and are stepped 1 kc. apart; therefore, switch $A_2$—$A_2$ may be considered a 1 kc. stepping switch.

Accordingly, the input to second decade mixer 21 will be 150 kc., 151 kc., 152 kc. . . . 159 kc., depending upon whether switch $A_1$ is at contact position 0, 1, 2 . . . or 9. These several input frequencies may be mixed in a two-stage, two process decade mixer 21 with frequencies 200 kc., 210 kc., 220 kc., 230 kc., 240 kc., 250 kc., 1150 kc., and 1250 kc., depending upon the positions of switches $B_1$ and $B_2$. Again, it will be convenient to gang switch $B_1$ and $B_2$ as indicated. If switches $A_1$ and $A_2$ are set at the 0 contact position, then a 150 kc. signal will be applied to the first input of the second decade mixer 21 as shown. Accordingly, if switches $B_1$—$B_2$ are set at the 0 position, then a frequency of 1500 kc. will be derived from the output of the second decade mixer 21, and it will follow that as the switch arms of switches $B_1$ and $B_2$ are progressed upwardly, the output signal frequency will also progress upwardly in steps of 10 kc as hereinbefore explained with reference to the first decade mixer 18. If switches $A_1$ and $A_2$ are set at the switch contact "1" position, then the following output frequencies may be derived from second decade mixer 21: 1501, 1511, 1521 . . . 1591 kc. Accordingly, and depending upon the various positions of switches $A_1$, $A_2$, $B_1$, and $B_2$, the following frequencies may be derived: 1500, 1501, 1502 . . . 1599 kc. These signal frequencies will be divided selectively by second decade divider 24; therefore, the following output frequencies will be obtainable from second divider 24, depending again upon the positioning of the aforementioned switches: 150, 150.1, 150.2 . . . 159.9 kc.

As with the preceding mixer stages, the following frequencies are fed to a third decade mixer 22: 200 through 250 kc. in steps of 10 kc., 1150 kc., and 1200 kc. The input to the third decade mixer 22 (which is derived from the output of second decade divider 24) will be 150 kc., 150.1 kc., 150.2 kc. . . . 159.9 kc. It will thus follow that the output signal frequencies derivable from third decade mixer 22, from the foregoing reasoning, will be 1500.0 kc., 1500.1 kc., 1500.2 kc. . . . 1599.9 kc. Therefore, from the third divider circuit 25 may be derived the following frequencies: 150.00 kc., 150.01 kc., 150.02 kc. . . . 159.99 kc. If these frequencies were multiplied by 100 by multiplier 26, for example, then the following frequencies would be obtainable: 15.001 mc., 15.002 mc., 15.003 mc. . . . 15.999 mc. It will be seen from the foregoing that the final result is that there will be output signal frequencies enjoying separations of 1 kc.

Accordingly, it will be seen that if the output signal from output multiplier 26 is designated in kilocycles, then the 1 kc. steps will be determined by the positioning of switches $A_1$—$A_2$; 10 kc. steps will be determined by the positioning of switches $B_1$ and $B_2$; and, 100 kc. steps will be controlled by the last switch pair, i.e. switches $C_1$ and $C_2$. Thus, the smallest divisions will be controlled by the first switch means, whereas the largest frequency divisions will be controlled by the last switch means and the setting thereof. It will be noted that this is obtainable by means of the feeding to the several mixer-divider combinations of the frequencies 200 kc., 210 kc., 220 kc., 230 kc., 240 kc., 250 kc., 1150 kc., and 1200 kc. The action of the mixer and divider combinations is such that as each progressive combination is reached, frequency steps are changed accordingly. The number of mixer and divider combinations to be employed in a single step-chain circuit of the type described will be determined by the ultimate frequency increments desired. In the case of a three-mixer divider combination step-chain circuit, it will be understood that the last decade divider may be deleted and the output signal frequencies from the preceding decade mixer be simply multiplied by output multiplier 26 in a desired manner.

It will be apparent to those skilled in the art that, conceivably, the 250 kc. output from decade frequency generator 17 might be deleted and that the 200 kc. line from decade frequency generator 17 would in such event be fed to switch contact terminals 5 of the several switches $A_1$, $B_1$, and $C_1$. In this event, switch contact No. 5 associated with switches $A_2$, $B_2$, and $C_2$ will be directly connected to the 1200 kc. line instead of the 1150 kc. line as shown in Figure 1. This is illustrated in Figure 1A.

Figure 2 illustrates a phase comparator circuit which may be employed in the present invention. In Figure 2, input terminal 200 is coupled through input capacitor 201 to control electrode 202 of duotriode vacuum tube 203. It will of course be understood that rather than employing a duotriode tube, two single triode tubes might reasonably have been substituted. Control electrode 202 is coupled through input resistor 204 to ground. Cathode 205 is maintained at ground potential. Anode 206 is coupled through capacitor 207 to control electrode 208 of vacuum tube 203. Control electrode 208 is coupled through resistor 209 to ground. Cathode 210 of vacuum tube 203 is maintained at ground potential as shown. Anode 206 of vacuum tube 203 is coupled through the filter combination of resistor 211 and capacitor 212 and also through resistor 213 to B+ terminal F. Anode 214 of duotriode vacuum tube 203 is coupled through the parallel resonant circuit consisitng of capacitor 215 and primary winding 216 of transformer 217, and also through resistor 213 to B+ terminal F. Secondary winding 218 of transformer 217 is coupled at one end thereof through capacitor 219 to ground and at the other end thereof through the series coupled combination of inductor 220 and low impedance inductor 221 to ground. The junction of secondary winding 218 and inductor 220 is directly connected to switch contact 222 as indicated. The junction of inductors 220 and 221 is directly connected to switch contact 223 as shown. Switch 224, in addition to including contacts 222 and 223, also includes switch contacts 225 and 226 and also arms 227 and 228. As is illustrated, switch 224 is a switch of the double-pole, double-throw type. Arm 228 is directly connected to output terminal 229. Arm 227 is directly connected to output terminal 230. A voltage divider 231 is coupled between output terminal 230 and ground, a tap of which is directly connected to output terminal 232. The junction of secondary winding 218 and capacitor 219 is coupled through grid-leak bias elements 233 and 234 to control electrode 235 of vacuum tube 236. Cathode 237 of vacuum tube 236 is directly connected (within the tube) to suppressor electrode 238 and also to ground. Screen electrode 239 is coupled to ground through bypass capacitor 240 and also through scren dropping resistor 241 to B+ terminal F. Anode 242 is coupled through a parallel resonant circuit including capacitor 243 and primary winding 244 of transformer 245, and also through dropping resistor 246 to B+ terminal F. The junction of capacitor 243, primary winding 244, and resistor 246 is coupled through bypass capacitor 247 to ground. Secondary winding 248 of transformer 245 is coupled at one end thereof through capacitor 249 and inductor 250 to ground, and at the other end thereof through inductor 251 and common inductor 250 to ground. The junction of secondary winding 248 of transformer 245 and inductor 251 is coupled through diode 252 (polarity as shown) through capacitor 253 to ground and also to terminal C.

It will be noted that the circuit branch coupled to input terminal 254 is identical with the upper circuit branch associated with input terminal 200, and accordingly will not be discussed separately in detail. It will be noted, however, that switch terminals 225 and 226 associated with the lower circuit branch are selectively coupled to signal output terminals 229, 230, and 232 by means of the appropriate disposition of switch 224. The output circuit of the lower circuit branch includes, as shown, secondary winding 255 of transformer 256 which is coupled at one end thereof through capacitor 257 to ground and at the other end thereof thorugh common inductor 250.

The circuit shown in Figure 2 operates as follows. The two duotriode vacuum tube stages each simply represent two-stage amplifiers exhibiting 100 kc. outputs. Input terminal 200 will be coupled to the local oscillator source whereas input terminal 254 will be coupled to the external standard associated with the frequency comparator circuit. The output circuits of both duotriode tubes will both exhibit an output resonant frequency of 100 kc. Double-pole, double-throw switch 224 is adapted for selectively coupling either the amplified local oscillator signal frequency or the amplified external source signal frequency to the three output terminals 229, 230, and 232. The voltage divider 231 associated with output terminal 232 is provided simply to reduce the voltage magnitude appearing at that output terminal. Tube stage 236 (and the corresponding tube stage in the lower circuit branch) constitutes a multiplier circuit employing grid-leak bias. The output circuits of both multipliers are made resonant at 1 mc. so that accurate frequency comparisons may be made. Thus, the input signal frequency is multiplied by a factor of 10. The voltage outputs from the two circuit branches are added together by virtue of the series coupling of the output parallel resonant circuits including secondary winding 248, inductor 251, and capacitor 249, and also secondary winding 255, capacitor 257, and inductor 250 which is common to both output circuits. The resultant composite output signal is rectified by means of diode 252 and the high frequencies are filtered to ground through bypass capacitor 253. The resultant D.C. signal appearing at the junction of diode 252 and capacitor 253 is fed to terminal C which is the meter terminal. Regardless of the relative phases of the input signals applied to input terminals 200 and 254, the D.C. meter (shown in Figure 1) will exhibit a constant reading; however, if the local oscillator frequency and the external source frequency differ slightly, then the meter indicator will fluctuate in the regular manner. One may adjust the frequency of the local oscillator source (not shown) so that when the output signal frequency is precisely the same as the signal frequency of the external standard employed, the meter indicator will gradually come to rest at a particular D.C. reading.

The frequency comparator circuit as above described is purely conventional in design and has been shown and described for the purpose of indicating the type of frequency comparator component which may be utilized in the system illustrated in Figure 1 of the drawings.

In Figure 3, input terminal 300 is coupled through coupling capacitor 301 to control electrode 302 of vacuum tube 303 and also through input resistor 304 to ground. Cathode 305 of vacuum tube 303 is maintained at ground potential, as is also suppressor electrode 306. Screen electrode 307 is coupled to R-F ground through bypass capacitor 308 and also through screen dropping resistor 309 to B+ terminal F. Anode 310 of vacuum tube 303 is coupled through a parallel resonant circuit consisting of capacitor 311 and primary winding 312 of transformer 313, and also through dropping resistor 314 to B+ terminal F. The junction of capacitor 311, primary winding 312, and resistor 314 is coupled to ground through R-F bypass capacitor 315. Secondary winding 316 of transformer 313 is coupled at one end thereof through capacitor 317 to ground and at the other end thereof through low impedance inductor 318 and capacitor 319 to ground. The junction of capacitor 317 and secondary winding 316 is coupled through coupling capacitor 320 to control electrode 321 of vacuum tube 322 and also through input resistor 323 to ground. Shunting the parallel combination of capacitors 319 and low impedance inductor 318 are series-coupled resistors 324 and 325, the junction between which is directly connected to output terminal 326. The junction of resistor 324, low impedance 318, and capacitor 319 is directly connected to output terminal 327. Cathode 328 of vacuum tube 322 is maintained at ground potential, as is also suppressor electrode 329 of the same tube. Screen electrode 330 of vacuum tube 322 is coupled to R-F ground by capacitor 331 and also through dropping resistor 332 to B+ terminal F. Anode 333 of vacuum tube 322 is coupled through three series-coupled parallel resonant circuits including capacitors 334, 335, and 336 and primary windings 337, 338, and 339, and also through dropping resistor 340 to B+ terminal F. Inductively coupled to primary windings 337, 338, and 339 are secondary windings 341, 342, and 343 of transformers 344, 345, and 346, respectively. Secondary winding 341 is coupled at one end thereof through resonating capacitor 347 to ground and at the other end thereof to 1 mc. output terminals 348, 349, and 350 and also through low impedance inductor 351 to ground potential. The junction of capacitor 347 and secondary winding 341 is coupled though coupling capacitor 352 to control electrode 353 of vacuum tube 354 and also through resistor 355 to ground. Secondary winding 342 of transformer 345 is coupled at one end thereof through capacitor 356 to ground and at the other end thereof to output terminals 357 and 358 and also through low impedance inductor 359 to ground. Secondary winding 343 of interstage transformer 346 is coupled at one end thereof through capacitor 360 to ground and at the other end thereof to output terminal 361 and also through low impedance inductor 362 to ground. Cathode 363 of vacuum tube 354 is maintained at ground potential, as is also suppressor electrode 364. Screen electrode 365 is coupled to ground through R-F bypass capacitor 366 and also through screen dropping resistor 367 to B+ terminal F. Anode 368 of vacuum tube 354 is coupled through two series-coupled, parallel resonant circuits including capacitors 369 and 370 and primary windings 371 and 372, and also through dropping resistor 373 to B+ terminal F. Secondary winding 374 of transformer 375 is coupled at one end thereof through capacitor 376 to ground and at the other end thereof to output terminal 377 and also through low impedance inductor 378 to ground. Secondary winding 379 of transformer 380 is coupled at one end thereof through capacitor 381 to ground and at the other end thereof to output terminal 382 and also through low impedance inductor 383 to ground. The junction of capacitor 381 and secondary winding 379 is directly coupled through capacitor 384 and resistor 385 to control electrode 386 of vacuum tube 387. The junction of control electrode 386 and resistor 385 is coupled through resistor 388 to ground. Cathode 389 of vacuum tube 387 is maintained at ground potential, as is also suppressor electrode 390. Screen electrode 391 is coupled to R-F ground through bypass capacitor 392 and also through dropping resistor 393 to B+ terminal F. Anode 394 of vacuum tube 387 is coupled through a parallel resonant circuit including capacitor 395 shunted by primary winding 396, of transformer 397, and also through resistor 398 to B+ terminal F. The junction of capacitor 395, primary winding 396, and resistor 398 is coupled to R-F ground through capacitor 399. Secondary winding 399.1 of transformer 397 is inductively coupled to primary winding 396 thereof, one end portion of secondary winding 399.1 being coupled to ground through resonating capacitor 399.2 and the other end of secondary winding 399.1 being directly connected to output terminal 399.3 and also through low impedance inductor 399.4 to ground. Sufficient filament voltage is supplied by terminals A and B as shown for the several parallel connected filaments of the vacuum tubes illustrated, the filaments being designated respectively as $F_1$, $F_2$, $F_3$, and $F_4$.

The circuit illustrated in Figure 3 operates as follows. An input signal frequency of 100 kc. is fed to input terminal 300 which is coupled via capacitor 301 to vacuum tube 303. The vacuum tube stage 303 serves as a doubler with a 200 kc. signal being developed in the output resonant circuit and translated through transformer 313 to the input side of tube stage 322. The voltage divider consisting of resistors 324 and 325 serves to provide high and low impedance outputs for output terminals 327 and 326, respectively. Accordingly, a signal frequency of 200 kc. is fed to the input side of vacuum tube 322. Tube stage 322 serves also as a multiplier but this time a multiplier by a factor of 5, 6, and 4, as is illustrated by the three, parallel resonant, output circuits of the tube stage. Accordingly, a 1 mc. signal is supplied output terminals 348, 349, and 350 and also the same signal is applied to the input of tube stage 354. The 1200 kc. signal developed in the primary winding circuit of transformer 345 is translated to secondary winding 342 where the signal is subsequently fed to output terminals 357 and 358. An 800 kc. signal is developed in the parallel resonant circuit including primary winding 339 of transformer 346, which is subsequently translated to secondary winding 343 thereof to appear at output terminal 361. The two parallel resonant circuits of tube stage 354 are designed to resonate at 3 mc. and 2 mc., respectively, so that tube stage 354 acts as both a doubler and tripler of the input signal frequency. The 3 mc. signal developed in the parallel resonant circuit associated with primary winding 371 is subsequently translated through transformer 375 and applied to output terminal 377. The signal developed in the primary winding, parallel resonant circuit associated with the transformer 380 is coupled inductively to secondary winding 379 where the signal is subsequently fed to control electrode 386 of vacuum tube 387 and also to output terminal 382 via low impedance inductor 383. Vacuum tube stage 387 acts as a frequency doubler so as to enable the generation of a 4 mc. signal which is inductively coupled through transformer 397 to secondary winding 399.1 thereof, and subsequently to output terminal 399.3.

The circuit illustrated in Figure 3 is purely conventional and merely indicates the type of multiplier circuit which may be employed in the present invention.

In Figure 4, input terminals 400 and 401 are adapted for coupling to signal sources having frequencies of 1200 kc. and 290 kc., respectively. Input terminal 400 is coupled through diode 402 (with the polarity of the diode being maintained as indicated) to control electrode 403 of vacuum tube 404. Input terminal 401 is coupled through resistor 405 to control electrode 403. Cathode 406 of vacuum tube 404 is coupled to ground through the cathode bias developing combination of resistor 407 and capacitor 408. Cathode 406 additionally is coupled to suppressor electrode 409 as shown. Screen electrode 410 is coupled through screen dropping resistor 411 to B+ terminal F and also to R-F ground via capacitor 412. Anode 413 is coupled through primary winding 414 of transformer 415 to B+ terminal F via resistor 416. Capacitor 417 shunts primary winding 414 and is coupled at one end thereof to ground through capacitor 418. Secondary winding 419 and primary winding 414 may be tuned by means of grounded slugs as indicated. Secondary winding 419 is coupled at one end thereof through resonating capacitor 420 and at the other end thereof through low impedance inductor 421 to ground. Low impedance inductor 421 is also coupled as indicated through reversed diodes 422 and 423 to opposite ends of primary winding 424 of transformer 425. Primary winding 424 is provided with a center tap 426 which is coupled through coupling capacitor 427 to cathode 428 of vacuum tube 429. Cathode 428 is also coupled through cathode resistor 430 to ground as shown. Secondary winding 431 is coupled between ground and control electrode 432 and is shunted by resonating capacitor 433. Vacuum tube 429 is a mixer type tube the suppressor 434 (or effective second control) electrode of which is coupled through isolating resistor 435 to input terminal 436. Input terminal 436 is adapted for coupling to a source of signals exhibiting a frequency of 100 kc. Screen electrode 437 of vacuum tube 429 is coupled to R-F ground via capacitor 438 and also to B+ terminal F via resistor 439. Anode 440 of vacuum tube 429 is serially coupled through primary windings 441, 442, and 443 of transformers 444, 445, and 446, and also through resistor 447 to B+ terminal F. Primary windings 441, 442, and 443 are shunted by capacitors 448, 449, and 450, respectively. The anode end of resistor 447 is by-passed to R-F ground via capacitor 451. The series combinations of secondary winding 452 and low impedance inductor 453, secondary winding 454 and low impedance inductor 455, and secondary winding 456 and low impedance inductor 457 are maintained at one end thereof at ground potential and are respectively shunted by resonating capacitors 458, 459, and 460. The junction of secondary winding 452 and low impedance inductor 453 is directly coupled to output terminal 461. The junction of secondary winding 456 and low impedance inductor 457 is directly coupled to output terminal 462. Terminal 463, however, constitutes an input terminal which is coupled through diode 464 (polarity is shown) to control electrode 465 of vacuum tube 466 and also through isolating resistor 467 to the input signal supplying junction of secondary winding 454 and low impedance inductor 455. Cathode 468 of vacuum tube 466 is coupled to ground through the cathode bias developing combination of resistor 469 and bypass capacitor 470. Suppressor electrode 471 is directly connected to cathode 468 as shown. Screen electrode 472 is coupled to ground through bypass capacitor 473 and also to B+ terminal F via screen dropping resistor 474. Anode 475 is serially coupled through primary windings 476 and 477, of transformers 478 and 479, respectively, and also through resistor 480 to B+ terminal F. Primary windings 476 and 477 are each shunted by capacitors 481 and 482, respectively. Secondary windings 483 and 484 of transformers 478 and 479, respectively, are each maintained at one end thereof at ground potential and are coupled to ground at the remaining end thereof through series-connected capacitors 485 and 486, and 487 and 488, respectively. The junction of capacitors 485 and 486 is coupled to control electrode 489 of vacuum tube 490 and also through input resistor 491 to ground. Cathode 492 of vacuum tube 490 is coupled through cathode resistor 493 to ground and also through coupling capacitor 494 to input terminal 463. The junction of capacitors 487 and 488 is directly coupled to control electrode 495 and also through input resistor 496 to ground. Anode 497 of vacuum tube 490 is serially coupled through primary winding 498 of transformer 499 and through resistor 499.1 to B+ terminal F. Primary winding 498 is shunted by capacitor 499.2, the lower end thereof being coupled to ground through R-F bypass capacitor 499.3. Anode 499.4 is coupled through primary winding 499.5 of transformer 499.6 and also through resistor 499.7 to B+ terminal F. Primary winding 499.5 is shunted by resonating capacitor 499.8. The lower end of capacitor 499.8 is by-passed to ground via R-F bypass capacitor 499.9. Secondary winding 499.10 is coupled at one end thereof through capacitor 499.11 to ground and at the other end thereof through low impedance inductor 499.12 to ground. The junction of secondary winding 499.10 and low impedance inductor 499.12 is directly coupled to output terminal 499.13. Secondary winding 499.14 of transformer 499.6 is coupled at one end thereof through capacitor 499.15 to ground and at the other end thereof through low impedance inductor 499.16 to ground. The junction of secondary winding 499.14 and low impedance inductor 499.16 is directly connected to output terminal 499.17. Terminals A and B are input terminals for the filaments of the tubes, which filaments are generally indicated by $F_1$, $F_2$, $F_3$, and $F_4$.

The circuit shown in Figure 4 operates as follows. Diode 402 associated with the input of the first tube stage is merely an isolating device. Conceivably, a capacitor might have been used equally as well. The two signals to be heterodyned or mixed appear at terminals 400 and 401 and are both applied to control electrode 403. Resistor 407 and capacitor 408 form the conventional cathode bias combination. The screen electrode and anode electrode connections are purely conventional. The output circuit of mixer tube stage 404, consisting of primary winding 414 and shunting capacitor 417 is tuned to the lower sideband produced by the mixer tube. Accordingly, if 1200 kc. and 290 kc. are the frequencies of the input signals, the parallel resonant circuit consisting of primary winding 414 and capacitor 417 will select and thus resonate at 910 kc. The combination of capacitor 420, secondary winding 419, and low impedance inductor 421 form a conventional parallel resonant circuit one end of which is maintained at ground potential. Inductor 421 is included merely to supply a low impedance driving point for the subsequent stage. It will be noted that the input circuit to vacuum tube 429 is a divider circuit with the parallel resonant combination of secondary winding 431 and capacitor 433 being chosen to resonate at 455 kc. An important portion of the present invention resides in the design of the tube stage 429. Neglecting for the moment the anode current drawn by vacuum tube 429, it will be seen that as the junction point between secondary winding 419 and low impedance inductor 421 increases positively, owing to the presence of a sinusoidal input signal, the lower diode 423 will conduct. Hence, current will flow up through the lower portion of primary winding 424, through the center tap 426 and capacitor 427 and also resistor 430 to ground. Resistor 430 is of very small value so that for all intent and purposes center tap 426 may be considered to be at R-F ground. During the negative portions of the input cycle the upper diode 422 will conduct current. Hence, during the negative half-cycle of the input signals, current flow will be from ground, through resistor 430 and capacitor 427 and also at center tap 426, and also through the upper portion of primary winding 424, to and through diode 422 to the signal drive point. Thus, during the positive half cycles the lower portion of primary winding 424 will be conductive; and during negative half cycles the upper portion of primary winding 424 will be conductive. Since virtual R-F ground is the voltage reference of the center tap, the voltage induced in the otherwise inactive portion of primary winding 424, by virtue of current flow in the used portion of the primary winding, will exactly counteract and thus balance out the back E.M.F. generated by virtue of Lenz' law in the conductive portion of the primary winding. Thus, in the absence of an input signal applied between ground and center tap 426 of primary winding 424, no signal will pass to secondary winding 431. However, when a signal is impressed between center tap 426 and ground, the input circuit to tube stage 429 will act as a balanced modulator so as to produce the upper and lower sideband frequencies but suppress the carrier frequency, i.e. the frequency of the signal appearing at the junction of secondary winding 419 and low impedance inductor 421.

It will be noted that the input parallel resonant circuit to vacuum tube 429 is tuned to 455 kc. or ½ of the 910 kc. signal input. This signal will of course appear across cathode resistor 430, i.e. the 455 kc. signal, which signal is fed back via coupling capacitor 427 to center tap 426. The circuit thus might be considered as a type of bootstrap circuit of a regenerative character since the operator will rely initially upon tube transients or a condition of slight unbalance in the circuit including primary winding 424 to produce an initial resonating of the parallel resonant input circuit associated with control electrode 432. Once this resonant condition is begun, then, of course, there will be sufficient signal to produce a voltage across cathode resistor 430 for coupling back to center tap 426 of primary winding 424.

The 455 kc. signal applied to control electrode 432 of vacuum tube 429 is mixed with 100 kc. input signal which is applied through isolating resistor 435 to suppressor electrode 434. The resultant upper sideband signal frequency together with the fundamentals of the two input signal frequencies will of course appear in the three output circuits of vacuum tube 429. The upper sideband frequency (555 kc.) is fed to output terminal 461, while the 100 kc. output signal is fed to output terminal 462. The 455 kc. output signal however is fed to control electrode 465 of vacuum tube 466 and is mixed with a 2 mc. signal appearing at input terminal 463. Diode 464 is again an isolating device so as to admit of the application of the two input signal frequencies to the same control electrode of a single vacuum tube. The upper and lower sidebands of the mixed signals appear at the two output circuits of vacuum tube 466 as shown. The 2455 kc. upper sideband signal is fed to control electrode 489 of vacuum tube 490 whereas the lower sideband of 1545 kc. is fed to control electrode 495 of vacuum tube 490. Input terminal 463, exhibiting a signal frequency of 2 mc., is coupled via coupling capacitor 494 to cathode 492 of vacuum tube 490. The two output circuits associated with vacuum tube 490 resonate at the respective upper sideband frequencies, and, accordingly, a signal of 4455 kc. is fed to output terminal 499.13 whereas a signal of 3545 kc. is fed to output terminal 499.17. Again, the circuit novelty resides, in the case of the auxiliary frequency generator of Figure 4, in the second stage which is a combination, regenerative boot-strap divider circuit and mixer circuit.

In Figure 5, input terminal 500 is coupled through resistor 501 to ground and also to the two diodes 502 and 503 as indicated. Diodes 502 and 503, with the polarity as indicated, are directly connected to primary winding 504 of transformer 505. Center tap 506 of primary winding 504 is coupled through coupling capacitor 507 to cathode 508 of vacuum tube 509. Secondary winding 510 of transformer 505 is shunted by resonating capacitor 511 and is coupled between ground and control electrode 512 of vacuum tube 509. Cathode 508 of vacuum tube 509 is coupled through resistor 513 to ground. Suppressor electrode 514 may be connected internally within vacuum tube 509 to cathode 508. Screen electrode 515 is maintained at ground potential by R-F bypass capacitor 516 and is also coupled to B+ terminal F through resistor 517. Anode 518 of vacuum tube 509 is coupled through primary winding 519 and through dropping resistor 520 to B+ terminal F. Primary winding 519 of transformer 521 is shunted by capacitor 522 the lower end of which is coupled to ground through bypass capacitor 523. Secondary winding 524 of transformer 521 is coupled through capacitor 525 to ground, through coupling capacitor 526 to control electrode 527 of vacuum tube 528, and also through input resistor 529 to ground. The remaining end of secondary winding 524 is coupled through low impedance inductor 530 to ground, to 50 kc. output terminal 531, through capacitor 532 to ground, and to control electrodes 533 and 534 of vacuum tubes 535 and 536, respectively. Cathode 537 of vacuum tube 528 is maintained directly at ground potential. Suppressor electrode 538 is directly connected to cathode 537. Screen electrode 539 is coupled to ground R-F bypass capacitor 540 and also through dropping resistor 541 to B+ terminal F. Anode 542 of vacuum tube 528 is coupled through primary winding 543 of transformer 544, primary winding 545 of transformer 546, and through resistor 547 to B+ terminal F. Primary winding 543 is shunted by capacitor 548. Primary winding 545 is directly shunted by capacitor 549. The lower end of capacitor 545 is coupled to R-F ground through bypass capacitor 550. Secondary winding 551 of transformer 544 is coupled at one end thereof through capacitor 552 to ground and at the other end thereof to 250 kc. output terminal 553 and also through low impedance inductor 554 to ground. Secondary winding 555 of transformer 546 is coupled through capacitor 556 to ground, through low impedance inductor 557 to ground, and also to 150 kc. output terminals 558 and 559. 50 kc. output terminal 531 is directly connected to control electrodes 533 and 534 of vacuum tubes 535 and 536, respectively, as hereinbefore explained. Cathodes 560 and 561 of vacuum tubes 535 and 536, respectively are coupled through common cathode resistor 562 to ground. Cathode resistor 562 is shunted by bypass capacitor 563. Screen electrode 564 is coupled to anode 565 by the parallel combination of inductor 566 and capacitor 567. Anode 565 of vacuum tube 535 is coupled through coupling capacitor 568 to suppressor electrode 569 of vacuum tube 536 and also through input resistor 570 to ground. Screen electrode 571 of vacuum tube 536 is coupled to anode 572 via the parallel combination of inductor 573 and shunting capacitor 574. Inductor 573 includes tap 575 which is coupled by capacitor 576 to suppressor electrode 577 of vacuum tube 535. Suppressor electrode 577 is coupled through resistor 578 to ground. Screen electrode 564 of vacuum tube 535 is directly coupled as shown through capacitor 579 to ground and also through resistors 580 and 581 (which of course may comprise simply one resistor) to B+ terminal F. It will be seen that the two screen electrodes of vacuum tubes 535 and 536 are coupled to the B+ source in a similar manner.

Anode 572 of vacuum tube 536 is coupled through capacitor 582 to control electrode 583 of vacuum tube 584 and also via input resistor 585 to ground. Cathode 586 of vacuum tube 584 is maintained at ground potential as is also suppressor electrode 587. Screen electrode 588 is coupled to R-F ground via bypass capacitor 589 and also through resistor 590 to B+ terminal F. Anode 591 of vacuum tube 584 is coupled through primary winding 592 of transformer 593, primary winding 594 of transformer 595 and resistor 596 to B+ terminal F. The anode resistor 596 is provided with a filter capacitor 597 which is coupled therefrom to ground. Primary winding 592 is shunted by capacitor 598. Primary winding 594 is shunted by capacitor 599. Secondary winding 599.1 of transformer 593 is coupled at one end thereof through capacitor 599.2 to ground and at the other end thereof through low impedance inductor 599.3 to ground. The junction of secondary winding 599.1 and low impedance inductor 599.3 is coupled to ground through filter capacitor 599.4 and also to 40 kc. output terminal 599.5. Secondary winding 599.6 is coupled at one end thereof through capacitor 599.7 to ground and at the other end thereof to 30 kc. output terminal 599.8 and also through low impedance inductor 599.9 to ground. Low impedance inductor 599.9 may be shunted by capacitor 599.10. The filaments of the several vacuum tubes may be supplied power from bus pins A and B, and the filaments, coupled together in parallel, are designated by the letters $F_1$, $F_2$, $F_3$, $F_4$, and $F_5$.

The circuit shown in Figure 5 operates as follows. Input terminal 500 is adapted for coupling to a source of input signal the frequency of which is 100 kc. for example. The circuit comprising the input to vacuum tube stage 509 will be recognized as being identical with the input circuit of the second tube stage in the circuit diagram illustrated in Figure 4; accordingly, the operation of the input circuit to tube 509 will not be repeated. It will be mentioned, however, that the input circuit operates as a divider (by 2) circuit and vacuum tube 509 will function additionally as an amplifier for the reduced signal frequency of 50 kc. The anode circuit of vacuum tube 509 shows it to resonate at a frequency of 50 kc.; thus, this signal is translated through the interstage transformer shown to control electrode 527 of vacuum tube 528. Tube stage 528 operates as a harmonic amplifier and the two output circuits thereof are made to resonate and thus produce a signal of 250 kc. and 150 kc., respectively. The 250 kc. output terminal 553 as shown is directly coupled to secondary winding 551 of the interstage transformer 544. The two 150 kc. output terminals 558 and 559 are directly coupled as shown to secondary winding 555 of transformer 546.

It will be noted that a 50 kc. output signal is tapped from the secondary winding 524, low impedance inductor 530 combination and that this signal is applied to control electrodes 533 and 534 of vacuum tubes 535 and 536, respectively. Hence, a 50 kc. signal will appear at both of the aforementioned control electrodes. Cathodes 560 and 561 of vacuum tubes 535 and 536 are provided with a common cathode circuit including cathode bias generating elements 562 and 563. The parallel resonant circuit consisting of elements 567 and 566, which parallel resonant circuit is common to the anode and screen circuits of vacuum tube 535, is chosen to resonate at 40 kc. which is of course a frequency equal to ⅘ of the input signal applied to control electrode 533 of vacuum tube 535. Correspondingly, the parallel resonant circuit including elements 574 and 573, which parallel resonant circuit is common to the anode and screen circuits of vacuum tube 536 is made to resonate at 10 kc., which frequency value is equal to ⅕ of the input signal frequency applied to electrode 534 of vacuum tube 536. The tube stages 535 and 536 operate as a regenerative criss-cross mixer circuit which operates in the following manner. With a 50 kc. signal applied to control electrode 533 of vacuum tube 535 there will be a small 40 kc. signal developed in the anode resonant circuit of vacuum tube 535. This small signal generated by the combination of inductor 566 and capacitor 567 is applied to the suppressor electrode of vacuum tube 536. At the same time, there will be developed in the anode circuit of vacuum tube 536 a 10 kc. signal, owing to the selection of the appropriate values of inductor 573 and capacitor 574 and the application of course of the 50 kc. signal to control electrode 534. The 40 kc. signal developed in the anode circuit of vacuum tube 535 is capacitively coupled, via capacitor 568, to suppressor electrode 569 of vacuum tube 536. Correspondingly, the 10 kc. signal developed in the anode circuit of vacuum tube 536 is coupled via inductive tap 575 and capacitor 576 to suppressor electrode 577 of vacuum tube 535. Accordingly, both of the tubes 535 and 536 operate as mixers, with 10 kc. and 50 kc. signals being mixed in vacuum tube 535, and with 50 kc. and 40 kc. signals being mixed in vacuum tube 536. The result of course will be a stronger signal developed in the parallel resonant circuits associated with the anode circuits of each tube. There is an inductive tap 575 utilized in connection with the anode circuit of vacuum tube 536 merely for wave form improvement. The resultant, high amplitude 10 kc. signal developed in the anode circuit of vacuum tube 536 is applied to control electrode 583 of vacuum tube 584. Vacuum tube 584 serves as a multiplier with the anode circuit thereof tuned to 40 kc. The 40 kc. signal developed in the output circuit of vacuum tube 584 is of course coupled to output terminal 599.5. Vacuum tube 584 also serves as a (×3) multiplier with a 30 kc. signal being developed in the parallel resonant circuit including capacitor 599 and primary winding 594. The 30 kc. signal developed therein is of course coupled through the transformer to output terminal 599.8.

Accordingly, the important features of the present invention reside in the tube stage 509 (similar in operation to the second tube stage in the drawing of Figure 4) and also in the regenerative criss-cross mixer circuit including tube stages 535 and 536.

In Figure 6, input terminals 600 and 601 are adapted for coupling to a 250 kc. signal source and are directly connected through diode 602 (polarity as shown) to control electrode 603 of vacuum tube 604. Input terminals 600 and 601 are also coupled through diode 605 to control electrode 606 of vacuum tube 607. Input terminal 608 is adapted for coupling to a signal source exhibiting a frequency of 40 kc. and is coupled through resistors 609 and 610 to control electrodes 603 and 611 of vacuum tubes 604 and 612, respectively. Input terminals 613 and 614 are adapted for coupling to a source of signals exhibiting a frequency of 200 kc. and are coupled through diodes 615 and 616 to control electrodes 617 and 611 of vacuum tubes 618 and 612, respectively. Input terminal 619 is adapted for coupling to a signal source exhibiting a frequency of 30 kc. and is coupled to control electrodes 606 and 617 of vacuum tubes 607 and 618, respectively, via resistors 620 and 621. Resistors 622, 623, 624, 625, and 626, and capacitors 627, 628, 629, 630, and 631 constitute cathode bias elements for their associated vacuum tubes. Resistors 632, 633, 634, 635, and 636, and capacitors 637, 638, 639, 640, and 641 are screen dropping resistors and R-F bypass capacitors for the respective vacuum tubes shown. The screen electrodes of the several vacuum tubes are ultimately coupled through the screen voltage dropping resistors to B+ terminal F. Anode 642 of vacuum tube 604 is serially coupled through primary winding 643 of transformer 644, primary winding 645 of transformer 646, and through resistor 647 to B+ terminal F. Capacitors 648 and 649 shunt their respective transformer primary windings 643 and 645. R-F bypass capacitor 650 is also provided for coupling R-F energy at the junction of resistor 647 and primary winding 645 to ground. Secondary winding 651 is coupled at one end thereof through capacitor 652 to ground, and the remaining end thereof is coupled to output terminal 653 and also through low impedance inductor 654 to ground. Secondary winding 655 of transformer 646 is coupled at one end thereof through capacitor 656 to ground and at the other end thereof to output terminal 657 and also through low impedance inductor 658 to ground. All of the anode circuits of the remaining vacuum tubes are substantially the same as that of the first tube stage in Figure 6, and accordingly will not be given particular discussion. Input terminal 659 is adapted for coupling to a signal source exhibiting a frequency of 1 mc. and is coupled through diode 660 (polarity as shown) to control electrode 661 of vacuum tube 662. Input terminal 663 is adapted for coupling to a signal source exhibiting a frequency of 150 kc. and is coupled through isolating resistor 664 to control electrode 661 of vacuum tube 662 as indicated. The screen electrode and anode electrode circuits are substantially identical to the circuits of foregoing tube stages.

It will be noted that the two parallel resonant circuits associated with the anode circuit of vacuum tube 604 are tuned to 290 kc. and 210 kc., respectively. The anode circuits of each succeeding tube stage are tuned to frequencies as follows: 220 kc., 230 kc., 240 kc., and 1150 kc. For the purposes of the present invention, in which the circuit of Figure 6 is utilized in a frequency synthesizer system, the terminals 601 and 614 may in fact comprise output terminals for translating the input signals of frequencies of 250 kc., and 200 kc., respectively.

The circuit shown in Figure 6 operates as follows. All of the tube stages are mixer stages with the signals to be mixed or heterodyned in each respective stage being supplied to the same control electrode. The input circuits are isolated by means of serially connected diodes and resistors shown in the circuits. Each of the parallel circuits are tuned to the frequencies indicated. Accordingly, there will be derived from the decade frequency generator illustrated in Figure 6 the following frequencies: 200 kc., 210 kc., 220 kc., 230 kc., 240 kc., 250 kc., and 1150 kc.

The filaments for the various tubes are generally indicated by the following letters: $F_1$, $F_2$, $F_3$, $F_4$, and $F_5$. All of the filaments, as indicated, are coupled together in parallel across the input filament supply pins A and B.

Figure 7 is a schematic diagram representative of the three decade mixers employed in the circuit of Figure 1. In Figure 7, input terminal 700 is adapted for coupling to a signal source exhibiting signal frequencies as indicated and, as shown, is coupled through diode 701 (polarity is shown) to control electrode 702 of vacuum tube 703. Input terminal 704 is adapted for coupling to a source of signals having the frequencies indicated and is also directly coupled through isolating resistor 705 to control electrode 702 of vacuum tube 703. Suppressor electrode 706 is connected to cathode 707 of the tube in a conventional manner. Cathode 707 is coupled through bias developing resistor 708 and bypass capacitor 709 to ground. Screen electrode 710 is coupled to R-F ground through capacitor 711 and to B+ terminal F via screen dropping resistor 712. Anode 713 of vacuum tube 703 is coupled through serially connected primary winding 714 of transformer 715 and resistor 716 to B+ terminal F. Primary winding 714 is shunted by resonating capacitor 717 the lower end of which is coupled directly to ground through capacitor 718. Primary winding 714 and secondary winding 719 of interstage transformer 715 may be tuned by means of grounded slugs as shown. Secondary winding 719 is shunted by resonating capacitor 720 as indicated. The shunt combination of secondary winding 719 and capacitor 720 is coupled between suppressor electrode 721 of vacuum tube 722 and ground, via bias developing resistor 723 and capacitor 724. Input terminal 725 is adapted for coupling to a source of signals having frequencies indicated and is directly coupled through resistor 726 to control electrode 727. Screen electrode 728 is coupled to R-F ground through bypass capacitor 729 and also through screen dropping resistor 730 to B+ terminal F. Anode 731 of vacuum tube 722 is coupled through the shunt combination of damping resistor 732, capacitor 733, and primary winding 734 of transformer 735, and also through dropping resistor 736 to B+ terminal F. The junction of resistor 736 and primary winding 734 is maintained at R-F ground potential via capacitor 737. Secondary winding 738 of transformer 735 is coupled at one end thereof through capacitor 739 to ground and at the other end thereof to output terminal 740 and also through low impedance inductor 741 to ground. The heater filaments for the two vacuum tubes shown are illustrated generally by the letters $F_1$ and $F_2$, being connected in parallel to filament voltage terminals A and B.

The circuit shown in Figure 7 operates as follows. Vacuum tube stage 703 is a single tube, single control grid mixer, with the two signals to be mixed or heterodyned together applied from input terminals 700 and 704. Diode 701 and resistor 705 are merely isolating devices. The upper sideband frequencies are selected by the transformer 715 tuned circuits, which are designed to be somewhat broadband. The signal developed in secondary winding 719 of transformer 715 is mixed in vacuum tube 722 with the signal taken from input terminal 725 and the upper sideband frequencies of the result are selected by the tuned circuits of output transformer 735. It will be seen with reference to tube stage 722 that cathode bias as well as suppressor grid-leak bias are supplied. Low impedance inductor 741 is inserted in this circuit so as to provide a low source impedance for the following circuitry and components.

Figure 8 illustrates in schematic diagram the design of the several decade dividers employed in the system illustrated in Figure 1.

In Figure 8, input terminal 800 is coupled through coupling capacitor 801 to control electrode 802 of vacuum tube 803 and also through input resistor 804 to ground. Cathode 805 of vacuum tube 803 is maintained at ground potential and is coupled to suppressor electrode 806. Screen electrode 807 is maintained at R-F ground potential by means of bypass capacitor 808. Screen electrode 807 is coupled through screen dropping resistor 809 to B+ terminal F. Anode 810 of vacuum tube 803 is coupled through the parallel combination of resistor 811, capacitor 812, and primary winding 813, and also through dropping resistor 814 to B+ terminal F. The lower end of primary winding 813 is coupled through bypass capacitor 814.1 to ground. Secondary winding 815 of transformer 816 is mutually coupled to primary winding 813 thereof. Secondary winding 815 is coupled at one end thereof through the parallel combination of capacitor 817 and resistor 818 to ground and at the other end thereof through low impedance inductor 819 to ground. The junction of secondary winding 815 and low impedance inductor 819 is coupled through reversed diodes 820 and 821 (polarity as shown or mutually opposite) and across primary winding 822 of interstage transformer 823. Primary winding 822 is provided with a center tap 824 which is coupled through capacitor 825 to cathode 826 of vacuum tube 827. Secondary winding 828 of tranformer 823 is shunted by capacitor 829; one end of secondary winding 828 is maintained at ground potential and at the other end is coupled directly to control electrodes 830 and 831 of vacuum tubes 827 and 832, respectively. Cathode 826 is coupled through cathode resistor 833 to ground. Anode 834 of vacuum tube 827 is coupled through the parallel combination of resistor 835, capacitor 836, and inductor 837 and also through resistor 838 to B+ terminal F. The upper end of resistor 838 is coupled to R-F ground potential by capacitor 839. Screen electrode 840 of vacuum tube 827 is directly coupled to screen electrode 841 of vacuum tube 832 and also through resistors 842 and 838 to B+ terminal F. Screen bypass capacitor 843 couples the aforementioned screen electrodes to R-F ground potential. Anode 844 of vacuum tube 832 is coupled through the parallel combination of capacitor 845 and primary winding 846 of interstage transformer 847 through anode dropping resistor 838 to B+ terminal F. Suppressor or second control electrode 848 is coupled through input resistor 849 to ground and also through coupling capacitor 850 to anode 834. Suppressor or second control electrode 851 of vacuum tube 827 is coupled through input resistor 852 to ground and also through coupling capacitor 853 to anode 844 of vacuum tube 832. Secondary winding 854 of transformer 847 is inductively coupled to primary winding 846 and is maintained at ground potential at one end thereof and is coupled at the other end to output terminal 855 as shown. The filaments $F_1$, $F_2$, and $F_3$ for the three vacuum tubes illustrated in Figure 8 are coupled in parallel preferably and the combination of the same are coupled to filament power terminals A and B.

The circuit shown in Figure 8 operates as follows. Input signals are applied to input terminal 800 and are coupled to control electrode 802 of vacuum tube 803. Tube stage 803 may be designed to be a saturation limiting amplifier having a damped output parallel resonant circuit including resistor 811, capacitor 812, and primary winding 813 of transformer 816. The second tube stage, i.e. tube stage 827, is similar to the second tube stage in the schematic diagram of Figure 4. Damping resistor 818 is provided the input parallel resonant circuit to the balanced modulator diode system. The input circuit to control electrode 830 of vacuum tube 827 is the divider circuit (as has been heretofore explained) and the divided frequency signal is applied to control electrodes 830 and 831 of vacuum tubes 827 and 832, respectively. The two parallel resonant output circuits associated with tube stages 827 and 832 are relatively broadband so as to admit the range of frequencies indicated. Assume that a 1600 kc. input signal is applied to input terminal 800. In such event, the signal developed by balanced modulator input circuit to vacuum tube 827 will be 800 kc. (as has been heretofore explained). This frequency of 800 kc. is applied both to control electrode 830 and also to control electrode 831. The parallel resonant circuit including capacitor 845 and primary winding 846 will resonate at 160 kc. The resulting resonant signal will be applied through coupling capacitor 853 to suppressor electrode 851 of vacuum tube 827. This 160 kc. signal will accordingly be mixed with the incoming 800 kc. signal applied to control electrode 830 so that the difference frequency signal of 640 kc. will appear in the output parallel resonant circuit of vacuum tube 827. This output signal developed in the circuit including resistor 835, capacitor 836, and primary winding 837 will in turn be coupled through coupling capacitor 850 to suppressor electrode 848 of vacuum tube 832. Accordingly, the 640 kc. signal will be mixed with the incoming 800 kc. signal to give a difference frequency in the output of tube stage 832 of 160 kc. Accordingly, there is here demonstrated the design and operation of a two-stage, criss-cross regenerative mixer circuit.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. In combination, first frequency generating means for generating a signal exhibiting a first frequency, second frequency generating means for generating a signal exhibiting a second frequency, first mixing means coupled to said first and second frequency generating means and responsive to signals therefrom for producing a sum frequency output signal, third frequency generating means for generating a plurality of frequencies stepped a particular frequency increment apart and including a plurality of corresponding output circuits therefor, second mixing means provided with a first switch means selectively coupled to said output circuits of said third frequency generating means and also with an input circuit coupled to said first mixing means for selectably mixing one of said signal frequencies of said frequency plurality with said output sum frequency signal of said first mixing means to produce a series of signal sum frequencies with the lowest frequency thereof being equal to a multiple of said first frequency generated by said first frequency generating means, and frequency dividing means coupled to said second mixing means for dividing the output signal frequencies thereof such that the lowest output signal frequency from said dividing means equals said first frequency generated by said first frequency generating means.

2. In combination, first frequency generating means for generating a signal exhibiting a first frequency, second frequency generating means for generating a signal exhibiting a second frequency, first mixing means coupled to said first and second frequency generating means and responsive to signals therefrom for producing a sum frequency output signal, third frequency generating means for generating a plurality of frequencies stepped a particular frequency increment apart and including a plurality of corresponding output circuits therefor, second mixing means provided with a first switch means selectively coupled to said output circuits of said third frequency generating means and also with an input circuit coupled to said first mixing means for selectably mixing one of said signal frequencies of said frequency plurality with said output sum frequency signal of said first mixing means to produce a series of signal sum frequencies with the lowest frequency thereof being equal to a multiple of said first frequency generated by said first frequency generating means, first frequency dividing means coupled to said second mixing means for dividing the output signal frequencies thereof such that the lowest output signal frequency from said first dividing means equals said first frequency generated by said first frequency generating means; third mixing means coupled to said second frequency generating means and said first frequency dividing means and provided with a second switch means selectively coupled to said output circuits of said third frequency generating means for selectively mixing one of said signal frequencies of said frequency plurality with the output signals of both said second frequency generating means and said first frequency dividing means to produce a series of signal sum frequencies with the lowest frequency thereof being equal to a multiple of said first frequency generated by said first frequency generating means, and an output circuit coupled to said third mixing means.

3. In combination, first frequency generating means for generating a signal exhibiting a first frequency, second frequency generating means for generating a signal exhibiting a second frequency, first mixing means coupled to said first and second frequency generating means and responsive to signals therefrom for producing a sum frequency output signal, third frequency generating means for generating a plurality of frequencies stepped a particular frequency increment apart and including a plurality of corresponding output circuits therefor, second mixing means provided with a first switch means selectively coupled to said output circuits of said third frequency generating means and also with an input circuit coupled to said first mixing means for selectably mixing one of said signal frequencies of said frequency plurality with said output sum frequency signal of said first mixing means to produce a series of signal sum frequencies with the lowest frequency thereof being equal to a multiple of said first frequency generated by said first frequency generating means, first frequencies dividing means coupled to said second mixing means for dividing the output signal frequencies thereof such that the lowest output signal frequency from said first dividing means equals said first frequency generated by said first frequency generating means; third mixing means coupled to said second frequency generating means and said first frequency dividing means and provided with a second switch means selectively coupled to said output circuits of said third frequency generating means for selectively mixing one of said signal frequencies of said frequency plurality with the output signals of both said second frequency generating means and said first frequency dividing means to produce a series of signal sum frequencies with the lowest frequency thereof being equal to a multiple of said first frequency generated by said first frequency generating means, second frequency dividing means coupled to said third mixing means for dividing the output signal frequencies thereof such that the lowest output signal frequency from said second dividing means equals said first frequency generated by said first frequency generating means, and an output circuit coupled to said second frequency dividing means.

4. In combination with the apparatus of claim 1, a plurality of series-coupled, interspaced, mixing means and dividing means serially coupled to said frequency dividing means, each of said plurality of mixing means being additionally coupled to said second frequency generating means and including separate switch means selectively coupled to said plurality of output circuits of said third frequency generating means for producing a series of signal sum frequencies with the lowest frequency thereof being equal to a multiple of said first frequency generated by said first frequency generating means, and each of said plurality of frequency dividing means producing output signal frequencies with the lowest frequency thereof being equal to said first frequency generated by said first frequency generating means.

5. In combination, a first signal source exhibiting a first frequency and having first and second terminals; a transformer having primary and secondary windings each being provided with first and second end terminals, said primary winding also being provided with a center tap; a first unidirectionally conductive device coupled between said first terminal of said first signal source and said first end terminal of said primary winding in a first conductive direction; a second unidirectionally conductive device coupled between said first terminal of said first signal source and said second end terminal of said primary winding in a second and opposite conductive direction; and a second signal source exhibiting a second frequency and coupled between said second terminal of said first signal source and said primary winding center tap.

6. In combination, a signal source having first and second terminals; a transformer having primary and secondary windings each being provided with first and second end terminals, said primary winding also being provided with a center tap; a first unidirectionally conductive device coupled between said first terminal of said signal source and said first end terminal of said primary winding in a first conductive direction; a second unidirectionally conductive device coupled between said first terminal of said signal source and said second end terminal of said primary winding in a second and opposite conductive direction; a translating stage having an input circuit coupled to said first and second end terminals of said secondary winding and also an output circuit, said translating stage additionally being provided with a vacuum tube having an anode coupled to said output circuit, a control electrode coupled to said input circuit, and a cathode; an impedance coupled between said cathode and said second end terminal of said secondary winding; and said cathode being coupled to said center tap of said primary winding.

7. In combination, a signal source exhibiting a first frequency and having first and second end terminals; a transformer having primary and secondary windings each being provided with first and second end terminals, said primary winding also being provided with a tap; a first unidirectionally conductive device coupled between said first terminal of said signal source and said first end terminal of said primary winding in a first conductive direction; a second unidirectionally conductive device coupled between said first terminal of said signal source and said second end terminal of said primary winding in a second and opposite conductive direction; a translating stage having a parallel resonant input circuit, including said secondary winding of said transformer, which resonates at the frequency equal to a sub-multiple of said first frequency generated by said signal source, said translating stage also being provided with an output circuit and with a vacuum tube having an anode coupled to said output circuit, a control electrode coupled to said input circuit, and a cathode; an impedance coupled between said cathode and said second end terminal of said secondary winding; and said cathode being coupled to said tap of said primary winding.

8. Apparatus according to claim 7 in which said vacuum tube includes a second control electrode, and in combination therewith, an additional signal source exhibiting a second frequency coupled to said additional control electrode of said vacuum tube.

9. In combination, first and second vacuum tubes each having an anode, a cathode, and first and second control electrodes, a signal source coupled to said first control electrodes of said first and second vacuum tubes, first and second parallel resonant circuits respectively coupled to said anodes of said first and second vacuum tubes at one end thereof and at the other end thereof maintained at a positive operating potential, a first capacitor coupled between said anode of said first vacuum tube and said second control electrode of said second vacuum tube, a first resistor coupled at one end thereof to said second control electrode of said second vacuum tube and maintained at the remaining end thereof at a common reference potential, said second parallel resonant circuit being supplied with an inductive tap, a second capacitor coupled between said inductive tap and said second control electrode of said first vacuum tube, a second resistor coupled at one end thereof to said second control electrode of said first vacuum tube and maintained at the remaining end thereof at said common reference potential, said cathodes of said first and second vacuum tubes being ultimately coupled to said common reference potential.

10. In combination, a signal source having first and second terminals; a transformer having primary and secondary windings each being provided with first and second end terminals, said primary winding also being provided with a tap, a first unidirectionally conductive device coupled between said first terminal of said first signal source and said first end terminal of said primary winding in a first conductive direction; a second unidirectionally conductive device coupled between said first terminal of said first signal source and said second end terminal of said primary winding in a second and opposite conductive direction; a first capacitor shunting said secondary winding of said transformer, first and second vacuum tubes each having an anode, a cathode, and first and second control electrodes, said first end terminal of said secondary winding being coupled to said first control electrodes of said first and second vacuum tubes, said second end terminal of said secondary winding being maintained at a common reference potential, an impedance coupled between said cathode of said first vacuum tube and said common reference potential, a second capacitor coupled between said cathode of said first vacuum tube and said tap of said primary winding of said transformer, a first parallel resonant circuit coupled at one end thereof to said anode of said first vacuum tube and maintained at the other end thereof at a positive operating potential, a second parallel resonant circuit coupled at one end thereof to said anode of said second vacuum tube and maintained at the other end thereof at said positive operating potential, a third capacitor coupling said first parallel resonant circuit with said second control electrode of said second vacuum tube, a first resistor coupled at one end thereof to said second control electrode of said second vacuum tube and maintained at the other end thereof at said common reference potential, a fourth capacitor coupled between said second parallel resonant circuit and said second control electrode of said first vacuum tube, a second resistor coupled at one end thereof to said second control electrode of said first vacuum tube and maintained at the other end thereof at said common reference potential, and cathode bias generating means coupled between said cathode of said second vacuum tube and said common reference potential.

11. Apparatus according to claim 10 in which said cathode impedance comprises resistive means.

12. In combination, frequency generating means for generating a plurality of signals exhibiting a first frequency, a second frequency and a plurality of additional frequencies stepped a particular frequency increment apart, and including a plurality of corresponding output circuits for said signals; mixing means coupled to said output circuits for said first and second signal frequencies and provided with switch means selectively coupled to said output circuits for said plurality of additional signal frequencies for selectably mixing one of said additional frequencies with both of said first and second frequencies to produce a series of signal frequencies with the lowest frequency thereof being equal to a multiple of said first frequency; frequency dividing means coupled to said mixing means for dividing the output signal frequencies thereof such that the lowest output signal frequency from said dividing means equals said first frequency generated by said frequency generating means; second mixing means coupled to said frequency dividing means and said output circuit for said second signal frequency and provided with second switch means selectively coupled to said output circuits for said plurality of additional signal frequencies for selectively mixing one of said additional frequencies with the output signals of both said frequency dividing means and said output circuit exhibiting said second frequency signal to produce a series of signal sum frequencies with the lowest frequency thereof being equal to a multiple of said first frequency generated by said frequency generating means; and an output circuit coupled to said second mixing means.

13. In combination, frequency generating means for generating a plurality of signals exhibiting a first frequency, a second frequency and a plurality of additional frequencies stepped a particular frequency increment apart, and including a plurality of corresponding output circuits for said signals; mixing means coupled to said output circuits for said first and second signal frequencies and provided with switch means selectively coupled to said output circuits for said plurality of additional signal frequencies for selectably mixing one of said additional frequencies with both of said first and second frequencies to produce a series of signal frequencies with the lowest frequency thereof being equal to a multiple of said first frequency; frequency dividing means coupled to said mixing means for dividing the output signal frequencies thereof such that the lowest output signal frequency from said dividing means equals said first frequency generated by said frequency generating means; second mixing means coupled to said frequency dividing means and said output circuit for said second signal frequency and provided with second switch means selectively coupled to said output circuits for said plurality of additional signal frequencies for selectively mixing one of said additional frequencies with the output signals of both said frequency dividing means and said output circuit exhibiting said second frequency signal to produce a series of signal sum frequencies with the lowest frequency thereof being equal to a multiple of said first frequency generated by said frequency generating means; second frequency dividing means coupled to said second mixing means for dividing the output signal frequencies thereof such that the lowest output signal frequency from said second dividing means equals said first frequency generated by said frequency generating means; and an output circuit coupled to said second frequency dividing means.

14. In combination, frequency generating means for generating a plurality of signals exhibiting a first frequency, a second frequency and a plurality of additional frequencies stepped a particular frequency increment apart, and including a plurality of corresponding output circuits for said signals; mixing means coupled to said output circuits for said first and second signal frequencies and provided with switch means selectively coupled to said output circuits for said plurality of additional signal frequencies for selectably mixing one of said additional frequencies with both of said first and second frequencies to produce a series of signal frequencies with the lowest frequency thereof being equal to a multiple of said first frequency; frequency dividing means coupled to said mixing means for dividing the output signal frequencies thereof such that the lowest output signal frequency from said dividing means equals said first frequency generated by said frequency generating means, a plurality of series-coupled, interspaced, mixing means and dividing means serially coupled to said frequency dividing means, each of said plurality of mixing means being additionally coupled to said output circuit exhibiting said second frequency and including separate switch means selectively coupled to said plurality of output circuits exhibiting said additional frequencies for producing a series of signal sum frequencies with the lowest frequency thereof being equal to a multiple of said first frequency generated by said frequency generating means, and each of said plurality of frequency dividing means producing output signal frequencies with the lowest frequency thereof being equal to said first frequency generated by said frequency generating means.

References Cited in the file of this patent

UNITED STATES PATENTS

| | | |
|---|---|---|
| 2,345,101 | Crosby | Mar. 28, 1944 |
| 2,418,568 | Bauer | Apr. 8, 1947 |
| 2,827,567 | White | Mar. 8, 1958 |